United States Patent [19]

Wilk

[11] 4,006,456
[45] Feb. 1, 1977

[54] LOOP FAULT LOCATION AND ISOLATION

[75] Inventor: John Michael Wilk, Kingston, N.Y.

[73] Assignee: International Business Machines Corporation, Armonk, N.Y.

[22] Filed: Jan. 2, 1976

[21] Appl. No.: 646,297

[52] U.S. Cl. .................. 340/146.1 R; 235/153 AK; 340/172.5
[51] Int. Cl.² ..................... G06F 11/04; H04B 3/46
[58] Field of Search ............ 235/153 AC, 153 AK; 340/146.1 R, 172.5

[56] References Cited

UNITED STATES PATENTS 3,633,169  1/1972  Bickford ..................... 340/172.5

*Primary Examiner*—R. Stephen Dildine, Jr.
*Attorney, Agent, or Firm*—Karl O. Hesse

[57] ABSTRACT

A simplified loop communication fault location and isolation circuit which utilizes sequences of power interruption pulses in DC power distributed on the signal lines from a master repeater to control loop signal wrap functions.

7 Claims, 5 Drawing Figures

|  | C1 | C2 |
|---|---|---|
| SYNCHRONIZING MESSAGE | 0 | 0 |
| DATA MESSAGE FOR A TERMINAL | 1 | 0 |
| COMMAND MESSAGE FOR A TERMINAL | 0 | 1 |
| DIAGNOSTIC MESSAGE FOR MASTER REPEATER 13 | 1 | 1 |

LOOP FAULT LOCATION AND ISOLATION

BACKGROUND OF THE INVENTION

Loop communication systems are desirable for many terminal applications such as retail, banking, medical and other similar environments. In such an environment, it is important to allow the operator to turn off power at one or more terminals when they are not being used. Normally, when power is turned off at a terminal, relay points at the terminal close to bypass the electrical connection of the loop communication link around the inoperative terminal.

It is also a well known fact that the distance which a signal can be propagated on a communication line is approximately inversely proportional to the square root of the frequency at which the signal is propagated. Therefore, in low speed communication links, where the probabilities are such that an operating terminal will be present every few miles, there is no need to have separate repeaters to power up and reshape the signals propagating on the loop. On the other hand, when the amount of traffic on the loop requires wider band width, the resultant higher frequencies which must be propagated will require reshaping at closer intervals. In some examples of low speed communication links of the prior art, the repeaters used to reshape the propagating signals on the loop are packaged in the base of each terminal and derive their power from the terminal power supplies. In high speed links where repeaters are needed and an operating terminal cannot be guaranteed, the repeaters derive their power from the signal lines themselves, as taught in U.S. Pat. No, 3,876,983.

An important feature of any loop communication system is the ability to locate and circumvent faults along the loop communication path. The prior art teaches various modes of operation, including routing the inbound and outbound loop links through the same physical locations so that portions of the loop may be eliminated as taught in U.S. Pat. No. 3,458,661. Another way of obtaining this feature is to provide a main loop and a standby loop routed through the same physical locations such as taught in U.S. Pat. No. 3,519,750. The prior art teaches the use of complex logic at each repeater which is mounted in the base of each terminal and, therefore, may share such logic with the terminal and be powered from the terminal power supplies for accomplishing the fault location and isolation functions. When the repeaters are to be physically mounted separate from the terminals, it becomes costly to provide such logic in each repeater, both from a monetary and a power consumption point of view. For example, if such logic must be powered via the signal communication lines, only a few repeaters could be driven because the higher current required by the logic will cause voltage drops approaching the voltage limitations on signal communication lines imposed by local electrical codes.

Therefore, a need has existed for some time for a simple, low cost but high speed loop communication link having a large number of repeaters which are capable of performing fault location and isolation functions, yet draw their power from a single master terminal over the loop signal lines.

SUMMARY OF THE INVENTION

It is an object of this invention to provide improved loop circuits for locating and isolating faults which do not require extensive command decoding circuits and, therefore, consume very little power.

It is a further object of this invention to isolate faults on a loop communication link without using the data transmitting and receiving amplifiers and logic and without the need for a separate control line.

It is a still further object of this invention to control loop fault location and isolation circuits by periodically interrupting power to switchover units or to repeaters in predetermined sequences.

These and other objects of the invention are accomplished by providing a simple pulse counter to control a power sequencing switch and data loop gates in each switchover unit or repeater. The counter at each unit responds to sequences of power interruption pulses generated by the master unit at a controller.

A PREFERRED EMBODIMENT OF THE INVENTION

Figure 1:
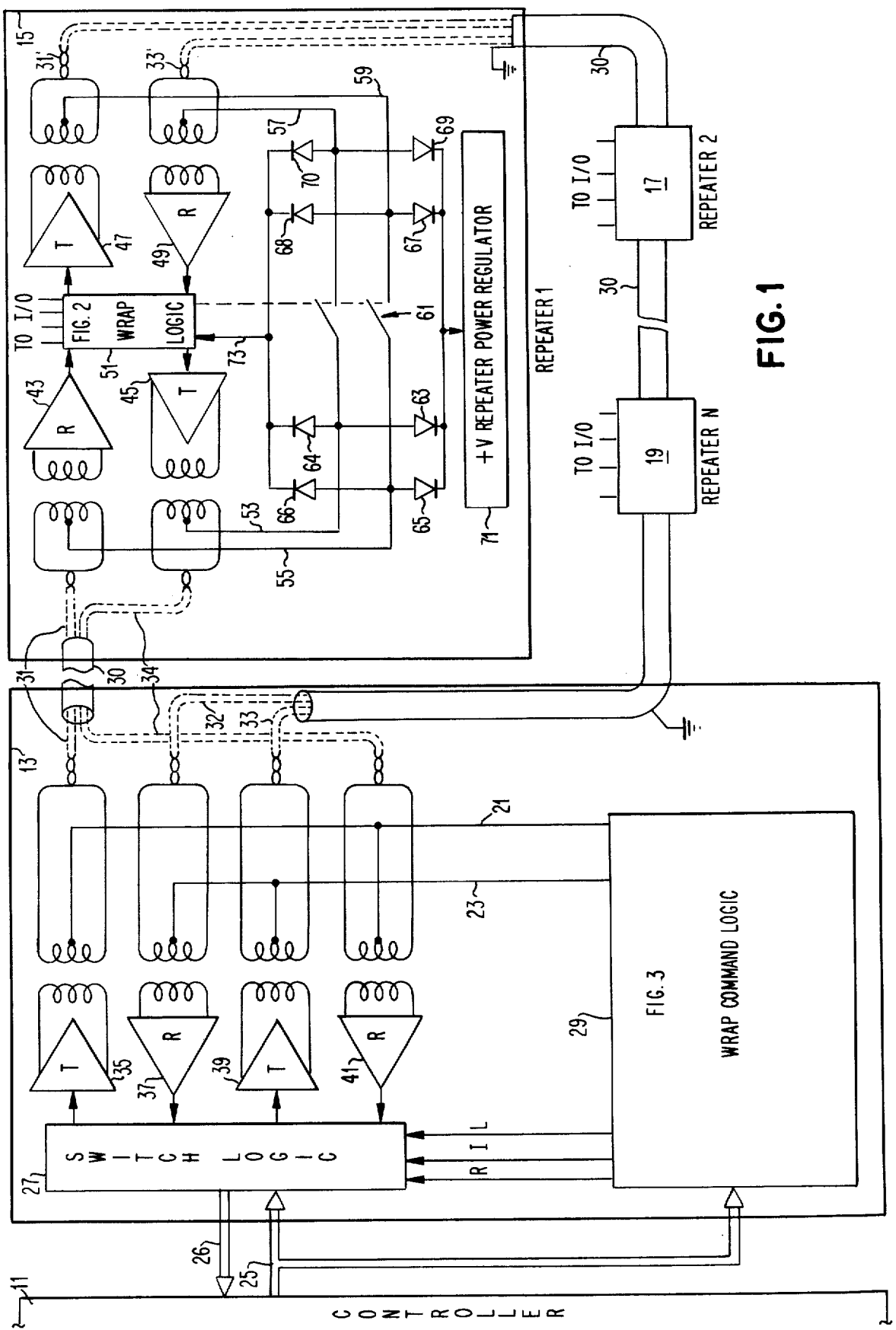
FIG. 1 shows the entire loop and fault location and isolation circuits in block diagram form.

With reference to FIG. 1, a preferred embodiment of the invention will be described. Controller 11 is connected to a plurality of repeaters by a main communication loop including twisted pair wires 31, 31', 32, and by a standby or auxiliary communication loop, including twisted pair wires 33, 33', and 34. Each of these loops is connected to the controller 11 by a master repeater 13. Master repeater 13 performs the function of amplifying and reshaping the signals received from and the signals transmitted to the loop wires as well as the second function of connecting the two loops to controller 11 in a plurality of different possible combinations for communication with the terminals connected to the repeaters and for communication with the wrap logic 51 at each of the repeaters.

The first function of amplifying and shaping the signals propagating on the loop is performed by transmitting amplifiers 35 and 39 and by receiving amplifiers 37 and 41. The second function of connecting the loops to controller 11 is performed by switch logic 27 which is in turn controlled by wrap command logic 29. Wrap command logic 29 also provides +60 volts DC power to wire 21 for wrap left diagnosic tests and +60 volts DC power to wire 23 for the wrap right diagnostic tests.

For ease of understanding of the preferred embodiment, it will be assumed that controller 11 is an intelligent controller having a programmable microcomputer which can be programmed to communicate with any of the terminals connected to repeaters 15, 17 or 19 and can be programmed to perform diagnostic tests to detect and isolate communication faults. An example microcomputer which may be used to embody controller 11 is taught in Ser. No. 483,270, filed June 26, 1974.

Master repeater 13 is connected to controller 11 by means of the input output data buses of the microcomputer of controller 11. For example, data out bus 25 is connected to switch logic 27 and wrap command logic 29 of master repeater 13 to provide control and information messages to repeater 13 while data in bus 26 is connected to switch logic 27 to receive information messages from master repeater 13.

Many loop message architectures are known in the prior art, including time division multiplexed messages, addressed messages, and various combinations thereof. Because the architecture of the message is not critical to the instant invention, a general message format is contemplated in FIG. 5 wherein the register 213 of wrap command logic 29 is shown in greater detail. If it is assumed that the output bus 25 of the microcomputer of controller 11 has 17 lines for transfer of 16 bit words and an I/O clock to input output devices, the 16 bit output words can be divided into two control bits followed by 14 message bits. The 14 message bits may include a terminal address, an 8 bit byte of data, and redundancy bits used in message error detection and correction. As previously described, the message architecture of message bits M1 through M14 is not critical to this invention. By way of example, however, a sequence of four different meanings has been attached to control bits C1 and C2 as identified in FIG. 5. A message preceded by all zero control bits indicates a synchronizing message used by all terminals to synchronize their internal clocks with the internal clock of controller 11 so that communication can occur. A C1 – C2 binary bit pattern of 1 – 0 may, for example, indicate that the message contains data for a terminal. As described previously, the message itself may contain an address bit pattern field indicating the terminal for which the message is destined. Each terminal will decode this address field and the terminal having an address corresponding to this bit pattern in the address field will act upon the message. A command message for a terminal is identified by the C1 bit being equal to a binary zero and the C2 bit being equal to a binary one. Each diagnostic message for the master repeater 13 is identified by both C1 and C2 control bits being equal to a binary one. It will be recognized by those of ordinary skill in the computing machinery art that alternate input output bus formats may be employed, depending upon the microcomputer chosen for controller 11. For example, the input output buses 25 and 26 may be combined into a single bus which may communicate messages in one direction during one cycle and another direction in another cycle of an input output sequence. Likewise, I/O buses 25 and 26 may have other than 17 lines. For example, an 8 bit, a 4 bit or even a single bit serial format may be employed.

Referring to wires 21 and 23 in FIG. 1, which convey +60 volts DC to the center tap of the transformers of amplifiers 35, 37, 39 and 41, the power distribution to each of the repeaters will be described. Current driven by this +60 volt DC source flows through each of the above mentioned transformers to twisted pair main loop wires 31 and standby loop wires 34, to the transformers associated with receiver 43 and transmitter 45 of the first repeater 15. A return path for power is provided from each repeater including repeater 15 to the master repeater 13 over metallic cable sheath 30 which acts as a combination power and signal shielding ground bus for the entire loop communication system. Although 30 is a signal shielding ground bus, no signal currents flow therein because of the common mode design of the amplifiers. Current is thereby allowed to flow from loop twisted pair wires 31 and 34 to wires 53 and 55 to +V repeater power regulator 71 via diodes 63 and 65. Power regulator 71 reduces the unregulated 60 volt DC power received from master repeater 13 to a regulated +5 volts DC potential for driving receivers 43 and 49, transmitters 45 and 47, and wrap logic 51. Because of the voltage drops in the twisted pair wires and the ground return sheath of the loop cabling, the voltage received at any one repeater may be substantially less than the 60 volts provided by the master repeater, but will at all times exceed +5 volts so that it can be regulated down to a stable, reliable, 5 volt DC potential. Regulator 71 may be any of a number of well known power regulation circuits. For example, regulator 71 may have a series pass transistor, or a series pass resistor accompanied by a shunt transistor, or a switching regulator transistor connected in a voltage feedback circuit, any of which is well known in the art of computing machinery. Power is forwarded through relay points 61 to the other repeaters 17 and 19.

Figure 2:
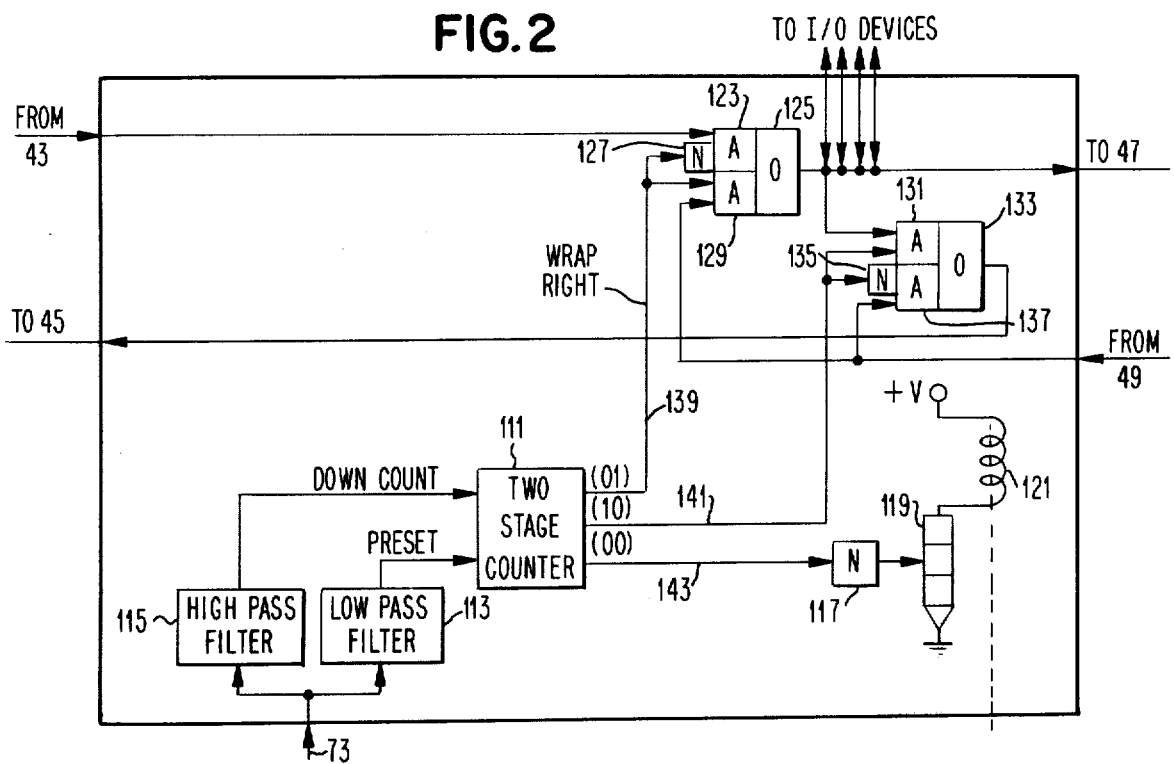
FIG. 2 is a detailed circuit diagram of the simple wrap logic in each switchover unit shown as a repeater.

Referring now to FIG. 2, the wrap control logic 51 which controls power bypass relay points 61 and the signal paths between receiver amplifiers 43 and 49 and transmitter amplifiers 45 and 47 in each repeater 15, 17, 19 will be described. Power interruption pulses will be received from wrap command logic 29 via diode 66 or 64 and wire 73 to the inputs of low pass filter 113 and high pass filter 115. Filters 113 and 115 may be passive RC type filters which provide the output signals labeled PRESET and DOWNCOUNT, respectively, on their outputs when a long power interruption pulse or a short power interruption pulse is received on wire 73, respectively. For example, if power is interrupted for a period of time greater than 50 milliseconds, a preset signal is generated at the output low pass filter 113 to a preset two stage counter 111 to a one-zero state providing an output signal on wire 141 and no output signals on wires 139 and 143. A power interruption pulse of 200 microseconds or less will cause high pass filter 115 to provide down count signal at its output to counter 111 to decrement counter 111 until it reaches an all zero count where further decrementing is inhibited. The all zero count state provides a signal on wire 143 which is inverted by inverter 117 so that transistor 119 connected thereto, will not be conducting when counter 111 is in a zero state. The relay coil 121 connected to the collector of transistor 119 controls relay points 61 to pass power around each repeater and on to the next repeater in the loop. Wire 139 from counter 111 is connected to an input of inverter 127 and an input of AND gate 129. The output of inverter 127 is connected to an input of AND gate 123 which has a second input connected to the output of receiver 43. The output of AND gate 123 is connected to an input of OR gate 125. AND gate 129 has a second input connected to repeater 49 and an output connected to a second input of OR gate 125. The output of OR gate 125 is connected to the input of transmitter 47 as well as to input output ports of various devices at a terminal such as a display, a keyboard, a printer, etc. The output of OR gate 125 is also connected to an input of AND gate 131 which has a second input connected to wire 141. Wire 141 is also connected via inverter 135 to AND gate 137 which has a second input connected to the output of receiver 49. OR gate 133 has a first input connected to the output of AND gate 131 and a second input connected to the output of AND 137. The output of OR gate 133 is connected to the input of transmitter 45. By means of the logic gates just described and transistor 119, two stage counter 111 provides diagnostic wrap connections at repeater 15 so that receiver and transmitter amplifiers at repeaters 13 and 15 and the twisted pair wires therebetween can be tested.

Figure 3:
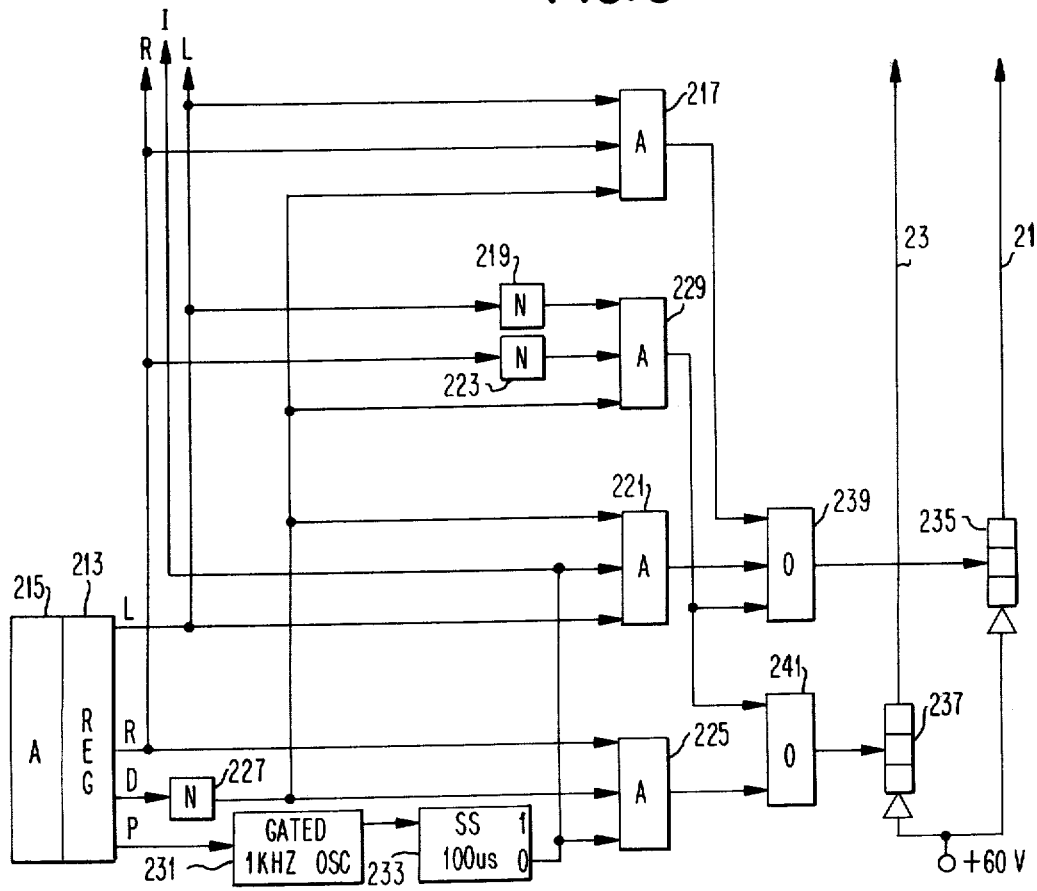
FIG. 3 is a detailed circuit of the power interruption circuits and wrap command logic in the master repeater.

Referring now to FIG. 3, there is shown the logic which converts each wrap command into the power interruption pulses and switch logic control signals necessary to control repeaters 13, 15, 17, and 19 for the previously mentioned diagnostic test program in the microcomputer of controller 11. AND gates 215 gate the message bits from bus 25 into buffer register 213 whenever the control bits C1 and C2 are both a binary one as previously explained with reference to FIG. 5. Register 213 has at least four outputs labeled L, R, D and P representing signals which appear on these outputs when a corresponding binary bit is stored in register 213. Output L is connected to AND gate 217, inverter 219, as well as AND gate 221 and switch logic 27 shown in FIG. 1. The R output is connected to AND 217, inverter 223, AND gate 225, as well as switch logic 27 shown in FIG. 1. The L and R outputs of register 213 represent left and right wrap command bits, respectively. The output labeled D to signify the drop relay command bit is connected to inverter 227 which in turn has an output connected to AND gates 217, 221, 225, and 229. The P output from register 213 signifying power interruption pulses command bit is connected to the gate input of 1 kilohertz oscillator 231 which generates a cycle every 1,000 microseconds so long as the binary one bit is stored in the register 213 bit position corresponding to the P output. The astable multivibrator output of oscillator 231 is connected to the input of single shot 233 which is a monostable multivibrator circuit. SS 233 changes state for 100 microseconds whenever an input signal is received such as at the end of each cycle generated by oscillator 231. The not, or inverse output, of single shot 233 is connected to inputs of AND gates 221 and 225 to provide the short power interruption pulses which control wrap logic 51 in each repeater. The inverse output of single shot 233, labeled I, is also connected to register 305 of FIG. 4 to interrupt controller 11 to keep it in synchronism with the wrap logic in each repeater. Line I sets bit positions C1, C2, and M4 to inform the controller 11 that a short power interruption pulse occurred.

A +60 volts source of power is connected to the emitters of power transistors 235 and 237. The collector of transistor 235 is connected to the center taps of the transformers associated with receiver 41 and transmitter 35 shown in FIG. 1. Likewise, the collector of transistor 237 is connected to the center taps of the transformers associated with receiver 37 and transmitter 39 shown in FIG. 1. The base of transistor 235 is connected to the output of OR gate 239 which in turn has three inputs connected to the outputs of AND gate 217, 221, and 229. Likewise, the base of transistor 237 is connected to the output of OR gate 241 which has inputs connected to the output of AND gate 225 and 229. Transistors 235 and 237 can, therefore, be controlled by the preceding described logic gates and multivibrators to provide the power interruption pulses necessary to control the wrap logic 51 of each repeater shown in FIG. 1.

Figure 4:
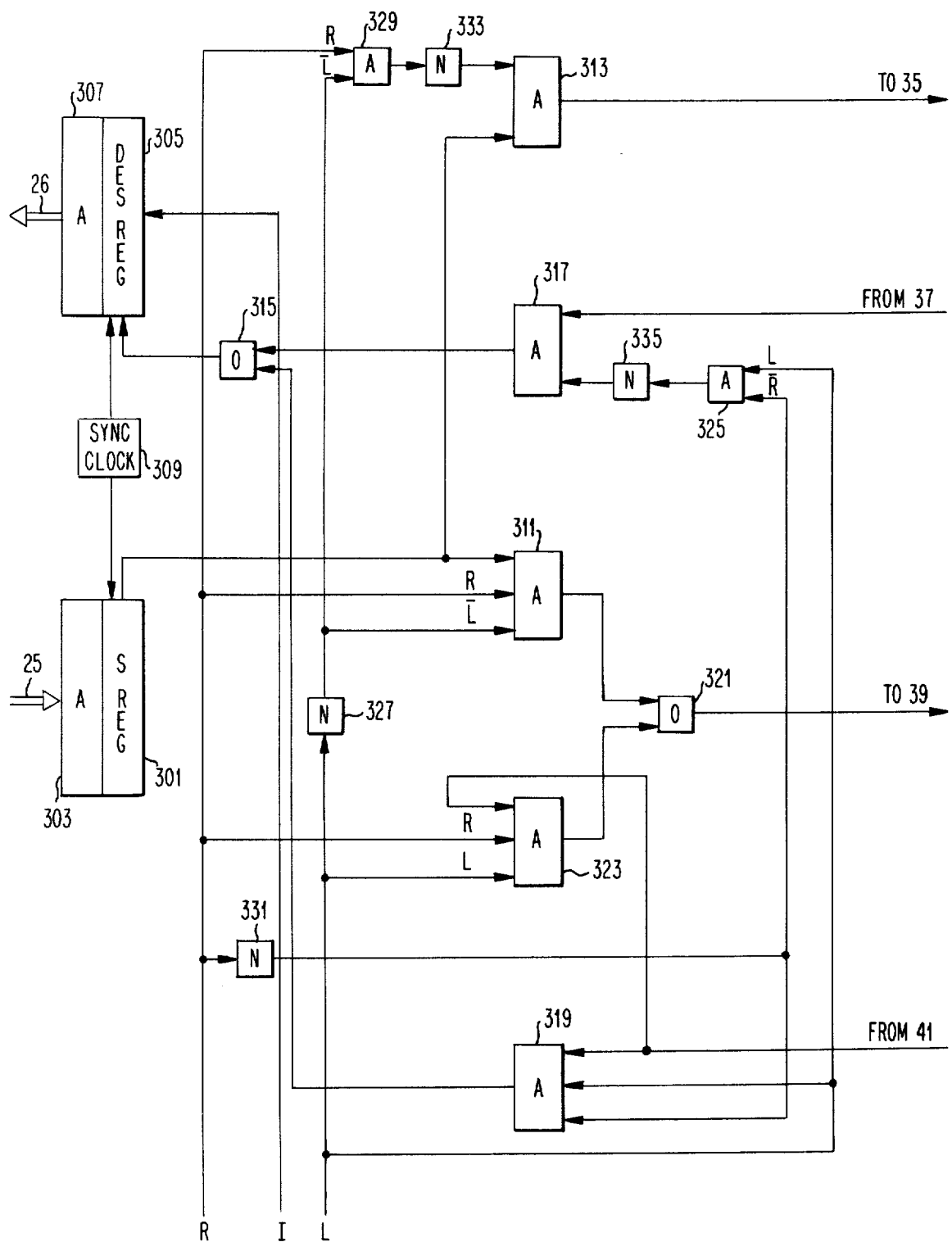
FIG. 4 is a detailed circuit diagram of the data switch logic controlled by the wrap command logic of FIG. 3 to send diagnostic data around the variously connected loop segments to allow the program of the master terminal or controller to detect and isolate faults.

Referring now to FIG. 4, the detailed logic circuits of switch logic 27 will be described. The logic of FIG. 4 controlled by command logic 29 causes the interconnection of registers 301 and 305 with tramsmitters 35 and 39 and receivers 37 and 41 and the interconnection of receiver 41 with transmitter 39 to perform diagnostic fault location and isolation functions. The diagnostic functions occur in four major states as follows:

normal state .. not L and not R .. connect 301 to 35 and 37 to 305;
wrap left .... L and not R ...... connect 301 to 35 and 41 to 305;
wrap right ... not L and R ...... connect 301 to 39 and 37 to 305;
isolate ...... L and R .......... connect 301 to 35 and 41 to 39 and 37 to 305.

Figure 5:
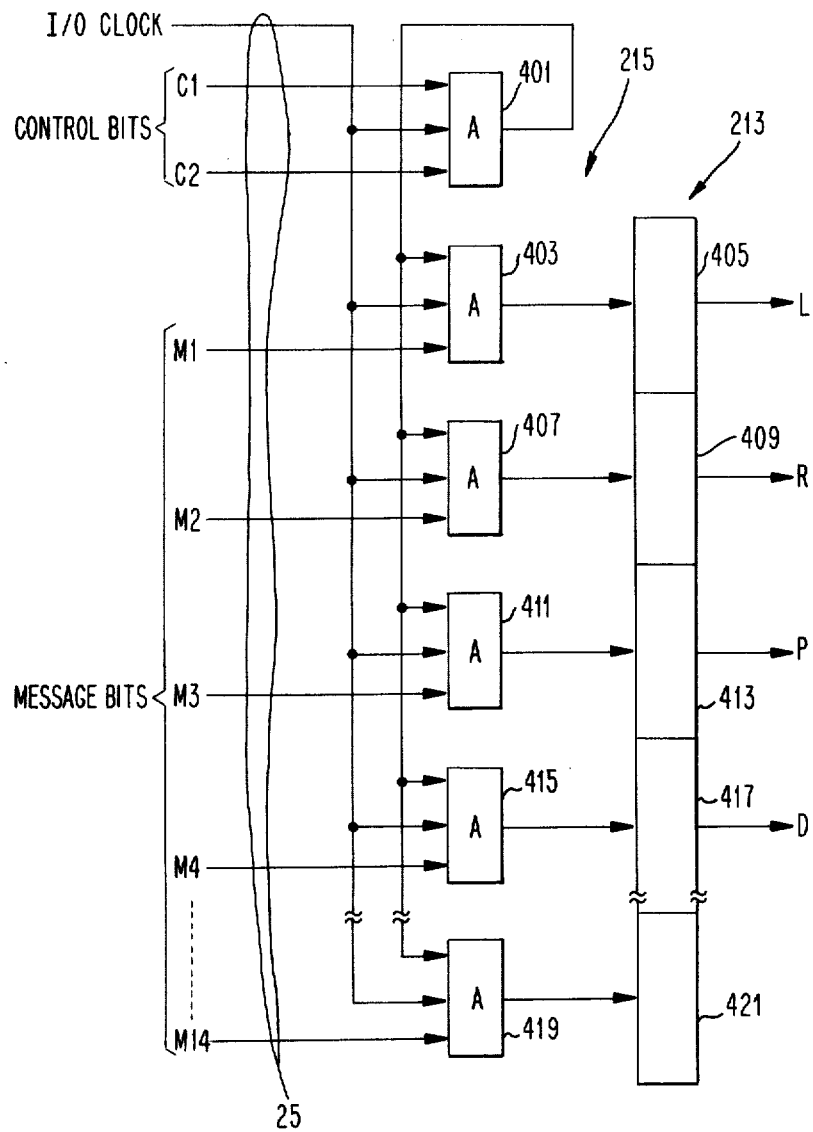
FIG. 5 shows circuit details of register 213 and gates 215 as well as their connection to bus 25 and the significance of the control bits C1 and C2.

Information from the microcomputer of controller 11 is transmitted over I/O bus out 25 to serializing buffer shift register 301 through AND gates 303 which are controlled by the data bus I/O clock as shown in FIG. 5 for register 213. Likewise, message information from terminals on the loop is serially fed into deserializing shift register 305 and gated out therefrom by AND gates 307 which are also controlled by the I/O clock similarly to the circuits shown in FIG. 5. The serial output from register 301 and the deserializing input to register 305 is obtained by a synchronized oscillator clock 309 which operates in synchronism with each clock in each of the terminals attached to a repeater along the communication loop. The serial output from register 301 is connected to the inputs of AND gates 311 and 313. The input to deserializing register 305 is connected via OR gate 315 to the outputs of AND gates 317 and 319. The input to transmitter 35 is connected to the output of AND gate 313. The outputs from receiver 37 is connected to and input of AND gate 317. The input to transmitter 39 is connected via OR gate 321 to the outputs of AND gates 311 and 323. An input to AND gate 323 is connected to the output of receiver 41 to provide a message turn around function when isolating a section of the loop having a fault. The wrap left control line labeled L from wrap command logic 29 is connected to inputs of AND gates 319, 323, and 325 as well as the input to inverter 327. The wrap right control line labeled R from wrap command logic 29 is connected to an input of AND gates 311, 323 and 329 as well as the input of inverter 331. The output of inverter 327 is connected to an input of AND gates 311 and 329. The output of inverter 331 is connected to an input of AND gates 319 and 325. The output of AND gate 329 is connected to an input of AND gate 313 via inverter 333. Likewise, the output of AND gate 325 is connected to an input of AND gate 317 via inverter 335.

Referring now to FIG. 5, the circuit for loading information into buffer 213 from bus 25 will be described in more detail. Information is transferred from bus 25 to register 213 by means of AND gates 215 which comprise gates 401, 403, 407, 411, 415, and 419 in FIG. 5. Each of these gates has one input connected to the I/O clock line of bus 25 which prevents information from being transferred from bus 25 during undefined transition periods as the data word on bus 25 is being changed by the microcomputer of controller 11. AND gate 401 is connected to both control bit bus lines C1 and C2. The output of AND gate 401 is connected to another input of the remaining AND gates 215. In this manner, message bits M1 through M14 are prevented from being loaded into register 213 unless binary one bits appear on all three lines C1, C2, and I/O clock.

The gating circuit details between bus 25 and serializing register 301 and between deserializing register 305 and bus 26 are very similar to those just described between bus 25 and register 213. The only substantive difference is that registers 301 and 305 are each 16 bits long so that the control bits C1 and C2 as well as the message bits M1 through M14 can be loaded therein. Gates 303 comprise 17 AND gates, one of which corresponds to gate 401 followed by an inverter for loading register 301 with bits C1–C2, and M1–M14 whenever C1 and C2 are not both a binary one. AND gates 307 associated with deserializing register 305 must also gate the interrupt message from wrap command logic 29. Gates 307 therefore do not require a control gate corresponding to gate 401 but comprise 16 gates analogous to gates 403, 407, and 411.

OPERATION OF THE PREFERRED EMBODIMENT

As described earlier with respect to FIG. 1, an object of the invention is to locate and isolate faults which may have occurred in the wiring or amplifiers around the loop. Fault detection may have been accomplished by a terminal through use of the redundancy bits, or a fault may have been detected by the microcomputer of controller 11, which may compare each message sent out on the loop wires 31 with the same message after it has propagated around the loop through wires 31' and 32. If the terminal detected the fault, the microcomputer program will be informed of the fault by absence of an acknowledgment by the terminal of the command or data message. If the microcomputer detected the fault, a program branch or interrupt can be taken directly to a diagnostic program. In either event, the diagnostic program must be actuated to step through a sequence of states to locate the fault and then to bypass the fault. It is well known that a series of latches and logic circuits could be used in place of the diagnostic program much in the same way as an execution control unit in a computer may be either microprogrammed apparatus or hardwired logic circuits.

Referring then to FIG. 1 and assuming that a fault has been detected on the loop, the sequence of I/O words shown in Table 1 will be generated to locate and isolate the fault.

TABLE 1

| STATE | C1 | C2 | M1 | M2 | M3 | M4 | — | M14 |
|-------|----|----|----|----|----|----|---|-----|
| A | 1 | 1 | 0 | 0 | 1 | 0 | — | 0 |
| A1 | wait 50 MS (milliseconds) | | | | | | | |
| B | 1 | 1 | 1 | 0 | 0 | 1 | — | 0 |
| B1 | 0 | 0 | X | X | X | X | — | X |
| B2 | If no error, count two 1 pulses into WL and go to B1 | | | | | | | |
| C | 1 | 1 | 0 | 1 | 0 | 1 | — | 0 |
| C1 | Count one 1 pulse into WR | | | | | | | |
| C2 | 0 | 0 | X | X | X | X | — | X |
| C3 | If no error, count two 1 pulses into WR and go to C2 | | | | | | | |
| D | wait 50 MS, then if WL is zero, go to D3 | | | | | | | |
| D1 | 1 | 1 | 1 | 0 | 0 | 1 | — | 0 |
| D2 | Count WL minus two, 1 pulses | | | | | | | |
| D3 | wait 50 MS, then if WR is one or less, go to D6 | | | | | | | |
| D4 | 1 | 1 | 1 | 1 | 0 | 1 | — | 0 |
| D5 | Count WR minus two, 1 pulses | | | | | | | |
| D6 | 1 | 1 | 1 | 1 | 0 | 0 | — | 0 |
| D7 | Return to normal communication | | | | | | | |

During the initialization state A, an I/O word is loaded by the microcomputer into register 213 via AND gates 215 and bus 25. The bit pattern of this word has binary one bits in the bit positions C1, C2, and M3 to provide a D output from register 213, and binary zero bits in the remaining bit positions. The program of the microcomputer then enters a do loop and counts time for at least 50 milliseconds to allow the signal labeled D of FIG. 3 to generate a long power interruption pulse. The signal D generates the long power interruption pulse by inhibiting each of AND gates 217, 221, 225 and 229 so that both transistors 235 and 237 are rendered non-conducting.

The end of the long power interruption pulse occurs when the system enters the wrap left fault location states B, shown in Table 1, wherein the contents of register 213 is replaced by binary one bits in position C1, C2, M1 and M4 with binary zero bits in other locations. The bit pattern in register 213 during wrap left states B causes signal L and signal P to appear in FIG. 3 and the signal D to disappear. The disappearance of signal D restores power to the left loop section or lobe via transistors 235. The restoration of power to the loop is detected by low pass filter 113 of FIG. 2 which presets counter 111 to a 1–0 state. In the 1–0 state, counter 111 provides a signal on wire 141 to enable gate 131 and disable gate 137. There being no signals on wires 139 and 143, gate 123 is enabled, gate 129 is disabled and transistor 119 is conducting to open relay points 61 and prevent power from reaching any repeater except repeater 15. AND gates 123 and 131, being activated, allow a test message from receiver 43 to be sent back to controller 11 via transmitter 45 through gates 123, 125, 131, and 133 during state B1.

Referring now to FIG. 4, the binary one in the M1 bit position of register 213 generates a signal L which enables AND gates 313, 319, and 325 while disabling AND gates 311, 317 and 329. AND gate 323 is disabled by the absence of the R signal because the M2 bit position of register 213 contains a binary zero.

The switch logic 27 and the wrap logic 51 are now conditioned to allow controller 11 to test transmitters 35 and 45, receivers 43 and 41, and wires 31 and 34 by sending a message during state B1 having a random bit pattern M1 through M14 with binary zero bits in position C1 and C2. The binary zero bits in positions C1 and C2 prevent a change in the content of register 213 because gates 215 are not activated. If the random bit pattern message transmitted from bus 25 compares with the message received on bus 26, the previously described path including transmitter 35, wire 31, receiver 43, transmitter 45, wire 34, and receiver 41 are all operational.

Because no error was detected in or between the master repeater and the first repeater 15, the contents of register 213 need not be changed and the wrap left state B is continued. The next repeater is tested by closing relay points 61 shown in FIG. 1. These relay points are closed by two short power interruption pulses generated by AND gate 221 which is twice momentarily disabled by the output of single shot 233. The short power interruption pulses each render transistor 235 non-conducting for approximately 100 microseconds. The short power interruption pulses are conducted through diode 66 to high pass filter 115 which decrements counter 111 of FIG. 2 to 0—0. When at 0—0, counter 111 enables gates 123 and 137 to pass messages from receiver 43 to transmitter 47 and from receiver 49 to transmitter 45. Wire 143 from counter 111 turns transistor 119 off allowing relay points 61 to send power to the next repeater.

Each short power interruption pulse also generates an interrupt signal I back to controller 11 microcomputer by setting register 305 bit positions C1, C2 and M4 to a binary one and all other positions to a binary zero. Use of interrupt feedback allows the microcomputer to execute other programs on different interrupt levels and only return control to the diagnostic microprogram when necessary to send out another I/O word to test another repeater and set of wires.

When power arrives at the next repeater, the low pass filter 113 therein presets its counter 111 to a 1-0 state to enable gates 123 and 131 and disable gate 137. After receiving the second interrupt message, controller 11 again enters state B1 to test transmitter 47 and receiver 49 of repeater 15 and receiver 43 and transmitter 45 of the next repeater 17.

Wrap left states B1 and B2 are repeatedly entered by controller 11 in sequence, accumulating the number of I pulses received in a register space designated WL until an error is detected at which time controller 11 enters the wrap right states C.

State C causes register 213 to provide signals R and P but not signals L or D. The presence of R causes transistor 237 to conduct and the absence of L turns transistor 235 off. Referring now to FIG. 4, the signal R enables gates 311 and 317 connecting register 301 to transmitter 39 and receiver 37 to register 315. Gates 313, 319 and 323 are disabled. Referring again to FIG. 2, it will be seen that counter 111 must be decremented to the 0-1 state in order to enable gate 129 which wraps messages received from the right side of the loop via receiver 49 to transmitter 47. Accordingly, the diagnostic microprogram waits in state C1 until after the first power interruption pulse message is received, before entering state C2 to send the test message to the nth repeater 19. Again, each I pulse is counted and is stored in a memory space or register designated WR.

Wrap right states C2 and C3 are repeatedly entered by controller 11 in sequence, accumulating the number of I pulses received in the space designated WR until an error is detected indicating that a fault location has been reached from the right.

The isolations states D are entered after the counts WL and WR have been accumulated which are a record of the location of at least one fault. State D is a test state to eliminate the left isolation loop lobe if a fault is in or between the master repeater and the first repeater. State D1 is a wrap left state which activates a left loop lobe by placing each operational repeater on the left side of a fault in a pass mode except the repeater immediately to the left of a fault, which is allowed to remain in the wrap left state by not decrementing its counter 111. This last operational repeater in the left isolation lobe is left in the wrap left state by allowing only WL minus two short power interruption pulses to be generated by gate 221 during the isolation state D2. State D3 is also a test state to eliminate the right isolation lobe if a fault is in or between the master repeater and the nth repeater 19.

State D4 is the isolating state in which an I/O word having binary one bits in positions C1, C2, M1, M2, and M4 and zero bits in other positions is loaded into register 213. During state D4, signals L, R and P are provided. The presence of both R and L enable gate 217 of FIG. 3 to hold power on the left loop lobe while gate 225 sends WR minus two short power interruption pulses through transistor 237 and diodes 68 and 70 to the wrap logic 51 of repeaters to the right of a fault. As with the left lobe, the WR minus two I pulses place each operational repeater except the repeater adjacent to a fault in the pass mode and the repeater adjacent the fault is left in the wrap right mode. Referring to FIG. 4, the presence of both the R and the L signals enables gates 313, 317, and 323, while disabling gates 311, 319, 325, and 329. These enabling gates connect serializing register 301 to transmitter 35, receiver 41 of the auxiliary loop to transmitter 39 of the auxiliary loop, and receiver 37 of the main loop to deserializing register 305 to subdivide the main and auxiliary loops into two lobes or sections thereby isolating the fault or faults which may exist in either or both loops.

While the invention has been described with respect to a preferred and specific embodiment thereof, it will be recognized by those of ordinary skill in the art of computing and communicating machinery design, that various changes in the detailed logic circuits shown by way of example, and changes in the specific sequences of operation, could be made without departing from the spirit and scope of the invention. Furthermore, certain of the logic circuits such as multivibrators 231 and 233 could be replaced by their equivalents such as time counting program loops in the diagnostic program. Likewise, the microprogram loop of state A1 could be replaced with a 500 millisecond timer embodied in multivibrator or programmed logic array connections in place of microprogram instructions in a read only or a read-write memory. These and other equivalents may be employed in the practice of the invention without departing from the spirit and scope thereof.

What is claimed is:

1. A loop communication system having a main loop and an auxiliary loop parallel to each other and each capable of circulating data signals in one of two possible directions opposite to each other, a loop controller connected to said loops for controlling data flow circulating in said loops, and wherein power is distributed from said loop controller to switchover units utilizing the same wires that serve for data transmission, and wherein said switchover units are each connected to said main and said auxiliary loops at various positions along said loops for subdividing said loops into a plurality of loop sections; the improvement comprising:
    wrap logic in each of said switchover units responsive to a sequence of power interruptions generated by said loop controller to locate and isolate faults in said main and said auxiliary loops.

2. The loop communication system of claim 1 wherein said wrap logic further comprises message gates controlled by a counting means, said counting means counting said power interruptions.

3. The loop communication system of claim 1 wherein each of said switchover units includes a power blocking switch controlled by said wrap logic to connect power interruption pulses to only one additional switchover unit at a time so that each of said loop sections can be unambiguously tested for faults by said controller.

4. The loop communication system of claim 3 wherein said wrap logic further comprises a counting means which counts said power interruption pulses for controlling message gates and said power blocking switch.

5. The loop communication system of claim 4 wherein said counting means is capable of assuming at least three states, a first state causing said power blocking switch to block power and said message gates to connect at input from said main loop to an output to said auxiliary loop, a second state causing said power blocking switch to block power and said messages gates to connect an input from said auxiliary loop to an output of said main loop, and a third state causing said power blocking switch to pass power and said message gates to connect said input from said main loop to said output to said main loop and to connect said input from said auxiliary loop to said output to said auxiliary loop.

6. The method of locating a fault in a loop communication system having a main loop and an auxiliary loop, each of said loops physically located parallel to each other and each of said loops being connected to switchover units which receive power as well as messages through the same wires of said loops from a loop controller, the improvement comprising the steps of:
  interrupting power to said loops for a first interval of time to initialize logic circuits in said switchover units;
  restoring power to a same end of each of said loops to place a first switchover unit in a wrap state to wrap a test message from said controller back to said controller and to block power to other switchover units thereby allowing a portion of said loops between said loop controller and said first switchover unit to be tested;
  interrupting said restored power to said same end of each of said loops for at least one second interval of time, said second interval of time being substantially shorter than said first interval of time, to place said first switchover unit in a pass state allowing both messages and power to pass through said first switchover unit to an adjacent second switchover unit, upon reaching said second switchover unit, said power placing said second switchover unit in said wrap state,
  accumulating said power interruptions of said second time interval, until a fault is detected by said controller, said accumulated power interruptions being a record of the location of said fault.

7. The method of claim 6 further comprising the steps of:
  interrupting power to said same end of each of said loops for at least said first interval of time to re-initialize said switchover units;
  interrupting said power to said same end of said loops for a number of second time intervals equal to said accumulated power interruptions of said second time interval minus said at least one second time interval to control said switchover units between said fault and said loop controller so that a switchover unit adjacent to said fault is in said wrap state and the remaining switchover units between said fault and said controller are each in said pass state for isolating said fault.

* * * * *